United States Patent [19]
Prachar

[11] 3,859,650
[45] Jan. 7, 1975

[54] ACCELERATION-RESPONSIVE SENSOR WITH READINESS INDICATOR CIRCUIT

[75] Inventor: Otakar P. Prachar, Troy, Mich.

[73] Assignee: General Motors Corporation, Detroit, Mich.

[22] Filed: Nov. 29, 1973

[21] Appl. No.: 419,987

[52] U.S. Cl.............. 340/262, 180/103, 200/61.53, 280/150 AB, 340/52 H
[51] Int. Cl. ........................ G08b 21/00, B60q 1/00
[58] Field of Search.......................... 340/202, 52 H; 200/61.45 R, 61.53, 52; 180/103; 280/150 AB

[56] References Cited
UNITED STATES PATENTS

| | | | |
|---|---|---|---|
| 3,628,384 | 12/1971 | Jones | 200/61.45 R |
| 3,638,501 | 2/1972 | Prachar | 200/61.53 |
| 3,727,575 | 4/1973 | Prachar | 280/150 AB |

*Primary Examiner*—Glen R. Swann, III
*Attorney, Agent, or Firm*—Herbert Furman

[57] ABSTRACT

An acceleration-responsive sensor includes an axial guide slidably receiving an operator which is biased from a normal unactuated position to an actuated position by a spring seating between the operator and the guide. The operator includes an axial bore opening to three radial bores each of which receives a respective ball. A headed control rod projects axially through the spring and guide and engages the balls to force the balls outwardly of their respective radial bores and into engagement with an internal radial groove of the guide to locate the operator in unactuated position. A seismic mass is slidably supported on the guide and a coil compression spring seats between the mass and the sensor housing to normally restrain the mass against movement unless subjected to an acceleration pulse or predetermined amplitude and time. The head of the control rod is operatively connected to the seismic mass through dielectric material so that the two are electrically insulated. A readiness indicator circuit is connected across a source of power and includes a signal, the control rod, balls, guide, and mass so that the readiness indicator circuit is closed when the rod engages the balls and is open when the rod is disengaged from the balls upon movement of the seismic mass.

1 Claim, 4 Drawing Figures

Patented Jan. 7, 1975

3,859,650

ACCELERATION-RESPONSIVE SENSOR WITH READINESS INDICATOR CIRCUIT

BACKGROUND OF THE INVENTION

This invention relates generally to acceleration-responsive sensors and more particularly to such a sensor wherein a seismic mass actuated control rod for releasing a detented operator forms part of a readiness indicator circuit to indicate the state of actuation of the sensor.

SUMMARY OF THE INVENTION

The sensor is of the type including a seismic mass actuated control rod which normally maintains a plurality of balls in a detent position between an operator and an axial guide for the operator and mass to maintain the operator in an actuated position. The control rod is insulated from and operatively connected to the mass. A normally closed readiness indicator circuit is connected across a source of power and includes a light or other signal, the control rod, balls, guide, and mass, and indicates the state of actuation of the sensor. Movement of the mass under an acceleration pulse of predetermined amplitude and time concurrently moves the control rod out of engagement with the balls to release the operator and open the readiness indicator circuit.

The primary feature of this invention is that it provides an improved acceleration-responsive sensor of the type including a seismic mass actuated control member controlling the detent position of a plurality of balls between an operator and an axial guide for the operator and mass, with the control member forming part of a readiness indicator circuit connected across a source of power and including a signal, the control rod, balls, guide, and mass.

BRIEF DESCRIPTION OF THE DRAWING

This and other features of the invention will be readily apparent from the following specification and drawings wherein.

DESCRIPTION OF THE PREFERRED EMBODIMENT

Figure 1:
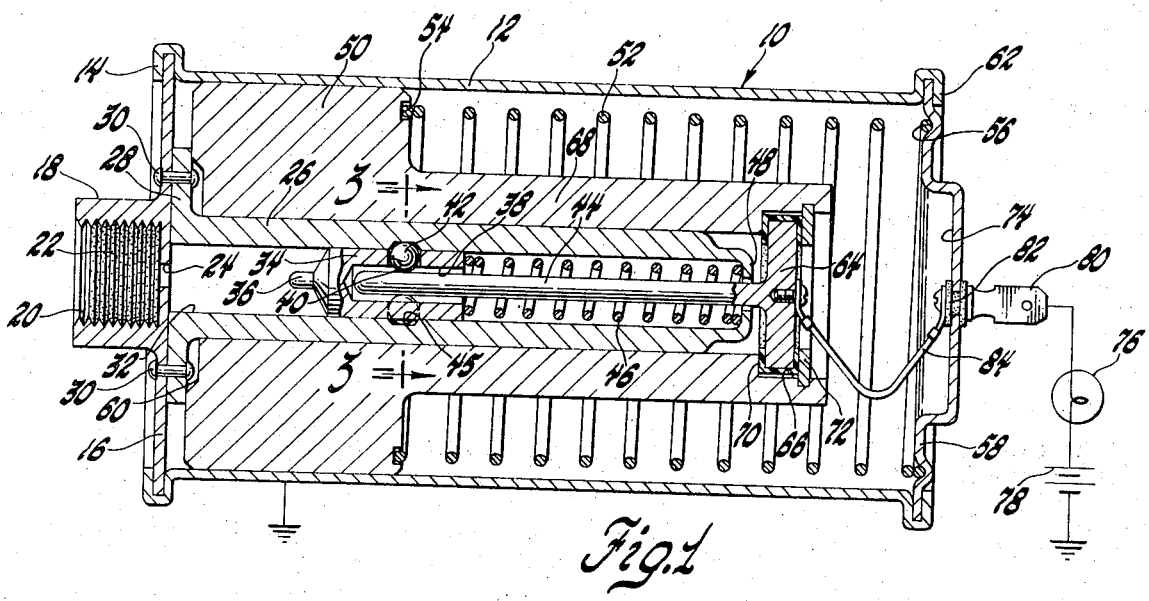
FIG. 1 is a sectional view of the sensor in unactuated position.

Referring now to the drawings, the sensor designated generally 10 includes a cylindrical metal housing 12 having the left-hand end thereof hem flanged at 14 over an end plate 16. The flange 14 may be continuous or discontinuous as desired. The end plate 16 includes an integral axial boss 18 which is integrally threaded at 20 to provide for the mounting of an impact actuated squib 22. An opening 24 in the end plate provides access to the squib.

A cylindrical axial guide 26 has the flange 28 thereof riveted at 30 to the end plate 16. The bore 32 of the guide is coaxial with the opening 24 and the boss 18. A cylindrical operator 34 is slidably mounted within the bore 32 and includes an impact pin 36 which is slightly smaller in OD than the opening 24. The operator includes an axial bore 38 which opens to three equidistantly spaced radial bores 40. A ball 42 is housed within each of the radial bores. A headed control rod or member 44 projects axially of the bore 32 and within the axial bore 38 of the operator when the operator is in its unactuated position of FIG. 1 to force the balls 42 radially outwardly of their respective bores 40 and into engagement with a groove 45 of the guide 26. This detents or holds the operator 34 in its unactuated position as shown in FIG. 1 against the action of a coil compression spring 46 which is coaxial of the guide 26 and seats between the operator and an apertured end flange 48 of the guide.

A cylindrical seismic mass 50 is slidably mounted on the guide 26 within the housing 12. A coil compression spring 52 seats within a groove 54 of the mass and a groove 56 of an end plate 58 to normally bias the mass to the left as shown in FIG. 1 and into engagement with the flange 28 to hold the mass against movement. The mass is relieved at 60 to avoid any interference between the mass and the rivets 30. The end plate 58 is hem flanged at 62 to the other end of the housing 12 in the same manner as the end plate 16.

The head 64 of the control member 44 is received within a counterbore 66 of an extension 68 of the mass 50. Dielectric material 70 encases the head 64 to electrically insulate the control member from the mass 50. The control member is fixed to the mass by a conventional split ring 72 received within a radial groove of the counterbore 66.

When the sensor is in its normal unactuated position shown in FIG. 1, the operator 34 is held against movement to the left to actuated position under the action of spring 46 by the detent action of the balls 42 engaging the groove 45. Since the control member 44 is fixed to the mass 50, no movement of the control member can occur unless the mass 50 moves against the action of its biasing spring 52.

When the mass 50 is subjected to an acceleration pulse of predetermined amplitude and time directed generally coaxially of the mass and the guide 26, the weight of the mass overcomes the force of the spring 52 so that the mass shifts to the right a sufficient distance to move the control member 44 out of engagement with the balls 42. The spring 46 then moves the operator 34 to its actuated position shown in FIG. 2. In this position the pin 36 of the operator engages the squib 22 to fire the squib. Since this sensor is particularly intended for use with an air cushion restraint system, the firing of the squib 22 provides the signal for actuation of such system. Since such systems are known, it is not believed that any further description is necessary. The movement of the mass 50 to the right is limited by the engagement of the extension 68 of the mass with an axial offset wall 74 of the end plate 58. The balls 42 move with the operator 34 as it moves to actuated position. When the fired squib 22 is removed, the sensor can be reset by moving the operator 34 to the right until the member 44, now in its FIG. 1 position, engages and forces balls 42 into groove 45. Squib 22 can then be replaced.

A readiness indicator circuit includes a signal light 76 which is electrically connected to a battery 78 and to a contact 80. The contact 80 extends through the wall 74 and is electrically insulated therefrom at 82. A conductor 84 connects the contact 80 with the head 64 of the control member 44. Since the control member, balls 42, guide 26, mass 50, and housing 12 are formed of metal, the readiness indicator circuit is normally closed and signal 76 indicates that the sensor 10 is in a ready state or unactuated position as shown in FIG. 1.

Figure 2:
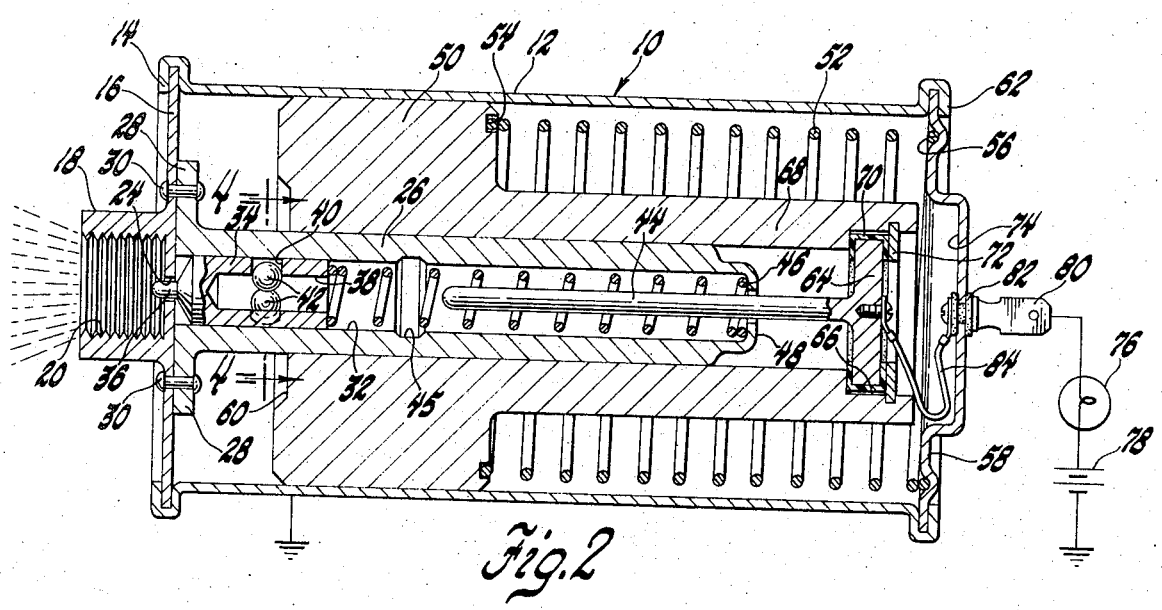
FIG. 2 is a view similar to FIG. 1 showing the sensor in actuated position.
Figure 3:
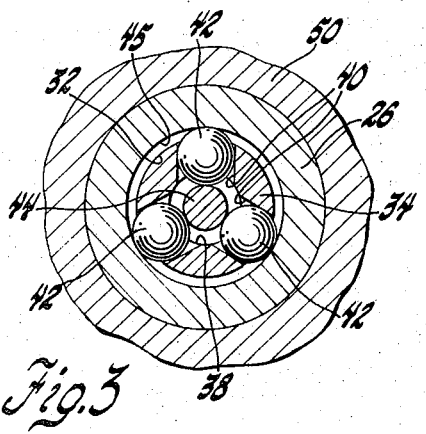
FIG. 3 is an enlarged sectional view taken generally along the plane indicated by line 3—3 of FIG. 1.
Figure 4:
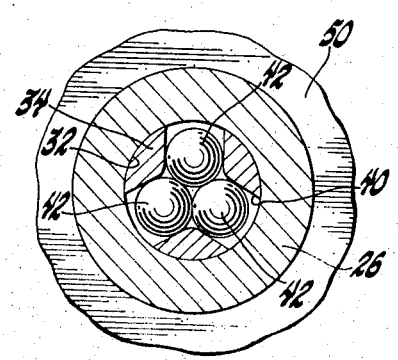
FIG. 4 is an enlarged sectional view taken generally along the plane indicated by line 4—4 of FIG. 2.

When the mass 50 moves to its actuated position as shown in FIG. 2, the control member 44 is disengaged from the balls 42 and the readiness indicator circuit is now open. Signal 76 now indicates that the sensor 10 is not in a ready state.

From the foregoing description, it can be seen that the sensor 10 includes a readiness indicator circuit indicating the state of readiness or position of the sensor. The indicator circuit provides a continuous monitor of the sensor.

Thus, this invention provides an improved acceleration-responsive sensor having a readiness indicator circuit.

I claim:

1. An acceleration-responsive sensor comprising, in combination, a support, an operator mounted on the support for movement between unactuated and actuated positions relative thereto, means biasing the operator to the actuated position, detent means movable between detent and released positions with respect to the operator and holding the operator in unactuated position when the detent means is in detent position, a seismic mass mounted on the support for movement relative thereto when subjected to an acceleration pulse of predetermined amplitude and time, detent operating means engageable with the detent means to maintain the detent means in detent position, means operatively connecting the detent operating means to the mass for concurrent movement therewith, and a readiness indicator circuit connected across a source of power and including a signal, the detent operating means, and the detent means, the engagement of the detent means and detent operating means providing a switch in the circuit controlling the signal to indicate a ready state of the sensor, the disengagement of the detent operating means from the detent means upon movement of the detent operating means concurrently with movement of the mass controlling the signal to indicate a nonready state of the sensor and moving the detent means to released position to permit the operator to move to actuated position.

* * * * *